United States Patent [19]
Meyer et al.

[11] Patent Number: 5,485,215
[45] Date of Patent: Jan. 16, 1996

[54] HDTV RASTER CONVERTER AND INTERPOLATION FILTER WITH SECTION OVERLAP

[75] Inventors: Edwin R. Meyer, Bensalem; Saiprasad V. Naimpally, Langhorne, both of Pa.; Larry Phillips, Collingswood; Shuji Inoue, Mount Holly, both of N.J.

[73] Assignee: Matsushita Electric Corporation of America, Secaucus, N.J.

[21] Appl. No.: 246,308

[22] Filed: May 19, 1994

[51] Int. Cl.$^6$ ................................................ H04N 7/12
[52] U.S. Cl. ........................................ 348/423; 348/438
[58] Field of Search ........................... 348/441, 423, 348/716, 718, 397, 398, 408, 571, 438; H04N 7/12, 7/01

[56] References Cited

U.S. PATENT DOCUMENTS

| | | | |
|---|---|---|---|
| 4,980,765 | 12/1990 | Kudo et al. ........................ | 348/716 |
| 5,057,911 | 10/1991 | Stec et al. . | |
| 5,337,153 | 8/1994 | Takagama ......................... | 348/441 |
| 5,353,063 | 10/1994 | Yagisawa et al. ................. | 348/716 |

OTHER PUBLICATIONS

"Decoding Issues In the ACTV System" by Michael A. Isnardi et al.; IEEE Transactions on Consumer Electronics, vol. 34, No. 1, Feb. 1988; pp. 111–120.
H. Sun, "Hierarchical Decoder for MPEG Compressed Video Data", IEEE Transactions on Consumer Electronics, vol. 39, No. 3, pp. 559–564 (Aug. 1993).
A. Mayer, "The Architecture of a Processor Array for Video Decompression", IEEE Transactions on Comsumer Electronics, vol. 39, No. 3, pp. 565–569 (Aug. 1993).
A. Netravali et al., "A High Quality Digital HDTV CODEC", IEEE Transactions on Consumer Electronics, vol. 37, No. 3, pp. 320–330 (Aug. 1991).
T. Liu et al., "Hardware Implementation and Cost of Decoders for Digital HDTV", IEEE Transactions on Consumer Electronics, vol. 37, No. 3, pp. 331–336 (Aug. 1991).

*Primary Examiner*—Victor R. Kostak
*Attorney, Agent, or Firm*—Ratner & Prestia

[57] ABSTRACT

A system and method for filtering a digital signal having a relatively high data rate uses circuitry which operates at a lower data rate. The filter includes an input section which receives the input signal and which divides the input signal into a plurality of contiguous segments. The system also includes a first filter which receives samples representing one of the plurality of segments and adjacent samples from the next contiguous one of the segments and which filters all of the received samples to produce a first filtered signal. A second filter receives samples of the next contiguous segment and filters those samples to produce a second filtered signal. The filtered signals are combined by providing the samples of the second filtered signal immediately after the samples of the first filtered signal to produce a filtered output signal. The invention also relates to using respective timing signals associated with the segments to determine when the samples of the first and second filtered signals are provided.

15 Claims, 11 Drawing Sheets

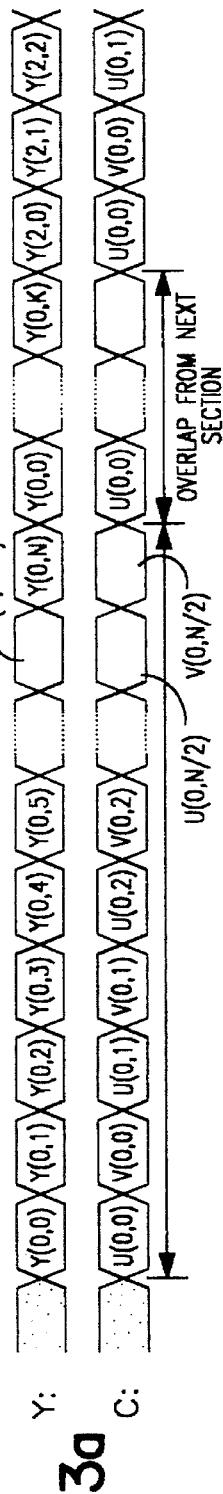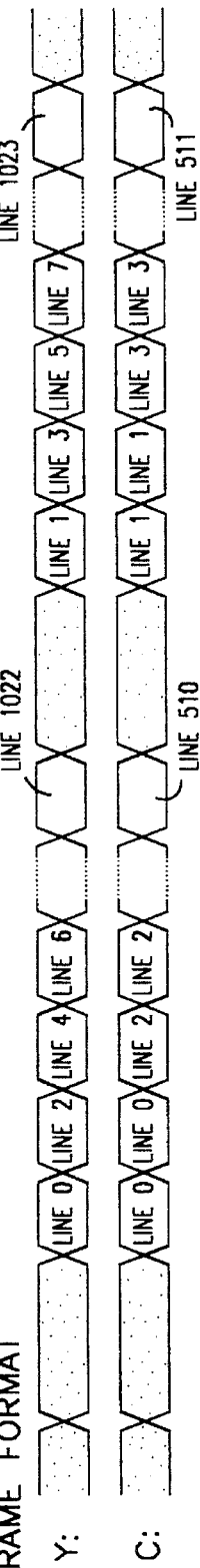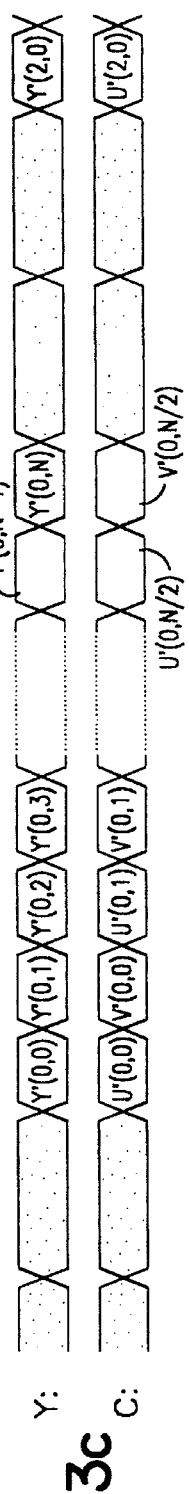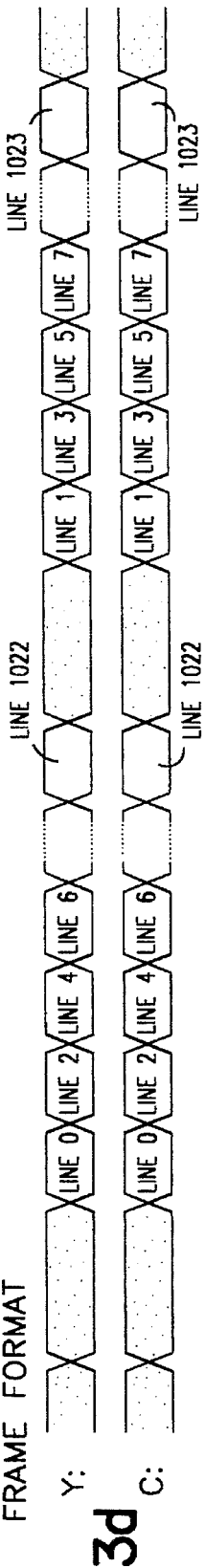
FIG. 3a INPUT (EACH SECTION) LINE FORMAT
FIG. 3b FRAME FORMAT
FIG. 3c OUTPUT (EACH SECTION) LINE FORMAT
FIG. 3d FRAME FORMAT

THE CASE OF 5:3 (1152)

THE CASE OF 4:3 (1408)

* SHIFT REGISTERS WORK IN 2 CLOCK CYCLE.

HDTV RASTER CONVERTER AND INTERPOLATION FILTER WITH SECTION OVERLAP

FIELD OF THE INVENTION

The present invention relates to a system and method for filtering, particularly, the present invention relates to interpolation filtering for digital video signals within a high definition television receiver.

BACKGROUND OF THE INVENTION

In the United States a standard has been proposed for digitally encoded high definition television signals. This standard is essentially the same as the MPEG-2 standard, proposed by the Moving Picture Experts Group (MPEG) of the International Standards Organization (ISO). This standard is described in a draft internal standard (DIS) publication entitled "Information Technology—Generic Coding of Moving Pictures and Associated Audio, Recommendation H.626" ISO/IEC 13818-2 DIS, 3/94 which is available from the ISO and which is hereby incorporated by reference for its teaching on the MPEG-2 digital video encoding standard.

The MPEG-2 standard is actually several different standards. In MPEG-2 several different profiles are defined, each corresponding to a different level of complexity of the encoded image. For each profile, different levels are defined, each level corresponding to a different image resolution. One of the MPEG-2 "standards", known as Main Profile, Main Level is intended for encoding video signals conforming to existing television standards (i.e., NTSC and PAL). Another "standard", known as Main Profile, High Level, is intended for encoding high-definition television images. Images encoded according to the Main Profile, High Level standard may have as many as 1,152 active lines per image frame and 1,920 pixels per line.

The Main Profile, Main Level standard, on the other hand, defines a maximum picture size of 768 pixels per line and 567 lines per frame. At a frame rate of 30 frames per second, signals encoded according to this standard have a data rate of 13,063,680 pixels per second. By contrast, images encoded according to the Main Profile, High Level standard have a maximum data rate of 1,152 * 1,920 * 30 or 66,355,200 pixels per second. This data rate is more than five times the data rate of image data encoded according to the Main Profile Main Level standard. The standard proposed for HDTV encoding in the United States is a subset of this standard, having as many as 1,080 lines per frame, 1,920 pixels per line and a maximum frame rate, for this frame size, of 30 frames per second. The maximum data rate for this proposed standard is still far greater than the maximum data rate for the Main Profile, Main Level standard.

Because of this difference in data rates, it is unlikely that the equipment used to decode Main Profile Main Level encoded data will be sufficient to decode high-definition television signals that have been encoded according to the Main Profile, High Level standard.

To be optimally effective, the coding systems should be relatively inexpensive and yet have sufficient power to decode these digital signals in real time.

One compression method that is contemplated for use in images which are encoded according to the MPEG-2 standard is to compress the image horizontally so that an image having a relatively large number of pixels per line is encoded as an image having a smaller number of pixels per line. To recover an image which does not appear to be horizontally squeezed, the data representing the image is desirably resampled to regenerate the original number of samples per line.

Using existing techniques, a decoder may be implemented using a single processor having a complex design and operating at a high data rate to perform this function. This high data rate, however, would require very expensive circuitry, which would be contrary to the implementation of a decoder in consumer television receiver in which cost is a major factor.

SUMMARY OF THE INVENTION

The present invention relates to the processing of digital signals by dividing the signals into sections and then processing each of the sections in parallel at a lower data rate than the data rate of the digital signal. The processing of the digital signal in parallel sections presents unique difficulties related to how the samples at the beginning and the end of a section are handled. Accordingly, the present invention further relates to the sharing of data among the sections so that the processed sections may be easily combined to generate processed digital signals.

The present invention further relates to a filter for filtering an input signal and a method for filtering. The filter receives a input signal having a first section signal followed by a second section signal. The second section signal has a boundary section signal which immediately follows the first section signal. The filter includes a first filter which receives the first section signal and the boundary section signal and which filters the first section signal using the boundary section signal and the first section signal to produce a first filtered signal. Also included is a second filter which receives the second section signal and which filters the second signal to produce a second filtered signal. Further, a multiplexer is provided for combining the first filtered signal and a portion of the filtered boundary section with the second filtered signal to produce a filtered output signal.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawings, in which:

FIGS. 3a–3d are timing diagrams which are useful for illustrating the input data and output data format of the exemplary interpolation filter of FIG. 2.

DETAILED DESCRIPTION

The exemplary embodiment of the invention interpolates decoded HDTV signals which have been encoded according to the MPEG-2 standard and in particular, the Main Profile, High Level MPEG-2 standard.

The invention described herein, however, is not limited to interpolation filtering of decoded HDTV signals. The filtering method described below may also be used to filter other types of digital signals which may be divided into sections, filtered, and then recombined.

The MPEG-2 Main Profile standard defines a sequence of images in six levels: the sequence level, the group of pictures level, the picture level, the slice level, the macroblock level and the block level. Each of these levels may be considered to be a record in a data stream, with the later-listed levels occurring as nested sub-levels in the earlier listed levels. The records for each level, except the block level, include a header section which contains data that is used in decoding its sub-records. The actual image pixel data is contained in the block records.

Each block of the encoded HDTV signal contains data representing 64 respective coefficient values of a discrete cosine transform (DCT) representation of 64 picture elements (pixels) in the HDTV image.

In the encoding process, the pixel data is subject to motion compensated differential coding prior to the discrete cosine transformation and the blocks of transformed coefficients are further encoded by applying run-length and variable length encoding techniques. A decoder which recovers the image sequence from the data stream reverses the encoding process. This decoder employs a variable length decoder, an inverse discrete cosine transform processor, a motion compensation processor, and an interpolation filter.

Figure 1:
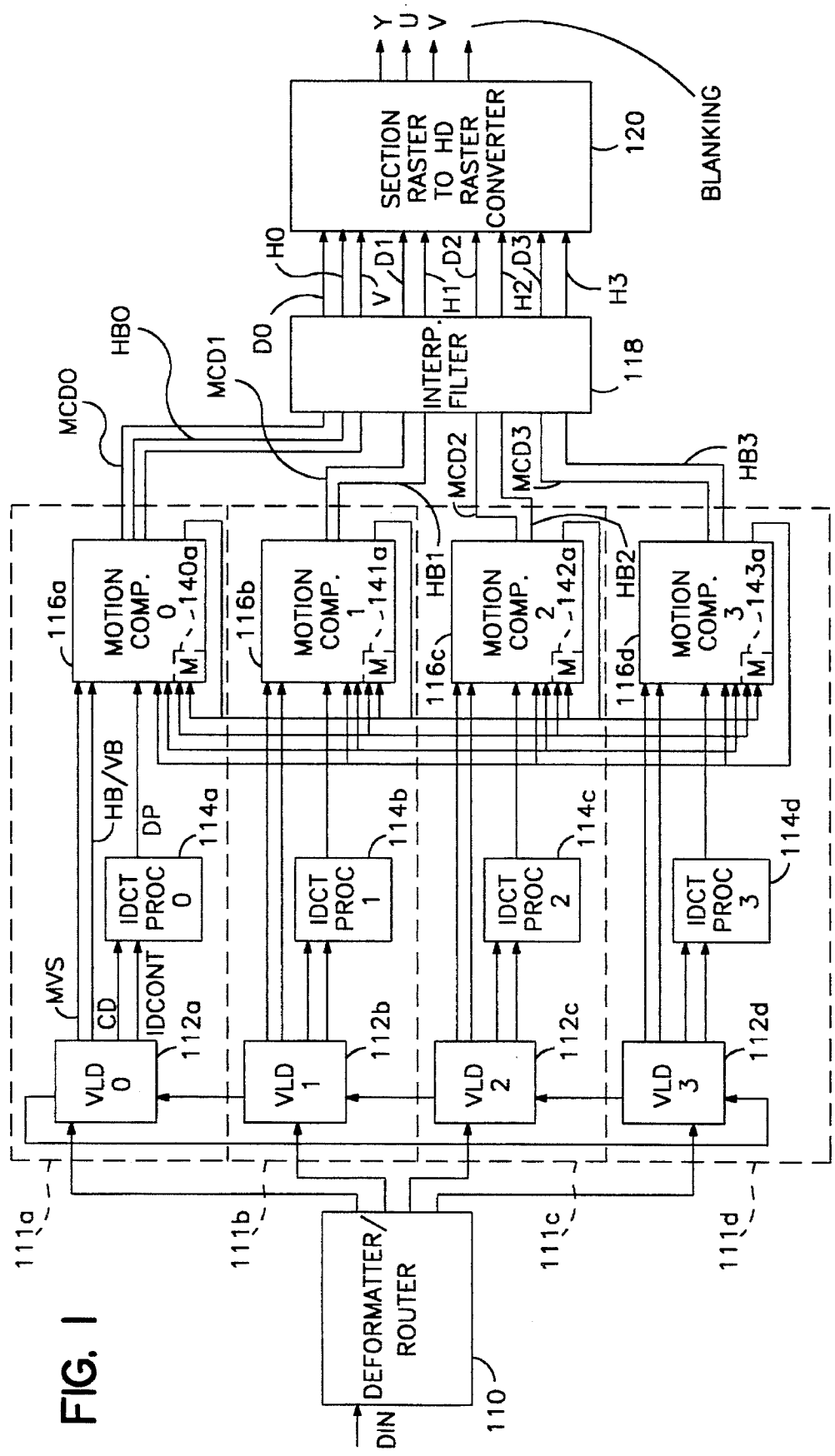
FIG. 1 is a block diagram of a decoder system which includes an exemplary embodiment of the present invention.

FIG. 1 is a block diagram of an exemplary HDTV decoding system, which may be used to decode high definition television signals that have been encoded according to the MPEG-2 standard. The diagram shown in FIG. 1 does not address some aspects of the high definition television decoding standard, for example, the demodulation of the received radio frequency HDTV signals to recover the digital data stream.

The decoder shown in FIG. 1, is arranged as four parallel decoders which are coupled to receive separate input data streams from a deformatter/router 110. The decoded data streams are combined in an interpolation filter 118 and a raster converter 120 to produce video signals that are used to drive a high definition monitor (not shown).

In the exemplary embodiment of the invention as shown in FIG. 1, the deformatter/router 110 receives a digital HDTV signal (DIN) as consecutive 8-bit bytes at its input port. The deformatter/router 110 performs two functions, it converts the 8-bit parallel bit stream into a bit serial data stream and it recognizes control information in the data stream down to the slice layer. The recognized control information is passed to all four of the decoders 111a, 111b, 111c and 111d. The slice start code and the data which follows it are passed to one of the four processors based on the horizontal starting position of the slice in the final image.

As described above, the MPEG-2 standard defines six layers of information for a sequence of images. These are the sequence layer, the group of pictures layer, the picture layer, the slice layer, the macroblock layer and the block layer.

These various layers are defined in the above-referenced document which describes the MPEG-2 standard. Briefly, the sequence layer includes the other five layers. The layers may be referred to as layers of data records. Thus, a sequence record includes at least one group of pictures record which, in turn, includes at least one picture record and so on, down to the block layer. The sequence layer defines the starting point of a set of images which can be decoded based only on the information following the start of the sequence. The next lower layer is the group of pictures layer. This layer defines a subset of the images contained in the sequence. The images in the group of pictures layer generally include at least one intra-encoded image and several predictively or bidirectionally encoded images.

Immediately below the group of pictures layer is the picture layer. The data records at this layer define single frame images. Below the picture layer is the slice layer. Each record at this layer represents a single slice of the image represented by the picture layer record. Below the slice layer are the macroblock and block layers. These layers represent successively more basic components of the image, as described above.

Each of the level records, from the sequence record to the slice record, begins with a start code. All start codes begin with at least 23 zeros and a one. The eight-bit value following the one determines the type of start code.

Following the sequence start code, are a plurality of parameters for the sequence of pictures. These include the horizontal and vertical size of the image in pixels, the pixel aspect ratio, the picture rate and the bit rate at which data is provided by the encoder.

Another two items which may be included in the sequence header are quantization matrices to be used in decoding intra-frame encoded data and non-intra-frame encoded data. If these matrices are not provided, default matrices, defined in the MPEG-2 standard, are used.

After the header information in the sequence record are one or more group of pictures level records. Each group of pictures record includes a header, containing a time code and two flags which are used in decoding the following group of pictures. The pictures in the group are represented by several picture records included in the group of pictures record. Following the final group of pictures in the sequence record is a sequence end code.

Unless the format of the data transmission is well known, decoding may only begin after a sequence start code and its accompanying header parameters have been encountered in the data stream. To prevent long delays between sequence start codes, it is contemplated in the MPEG-2 standard that these start codes and their associated header information may be inserted multiple times in a given sequence. These header blocks may be inserted, for example, between alternate group of pictures records.

The header for the picture layer includes a temporal reference, which defines the order in which the pictures are displayed; a picture coding type which indicates that the picture is either intra-encoded (I-frame) forward predictively encoded (P-frame) or bidirectionally predictively encoded (B-frame). The picture header also contains a value which indicates how much of the bit stream should be buffered before the decoding operation can begin, and, optionally, a pair of values which define how motion compensation processing is to occur on a whole-frame basis (e.g. to describe an underlying motion that affects the entire frame, such as an image pan).

Figure 5:
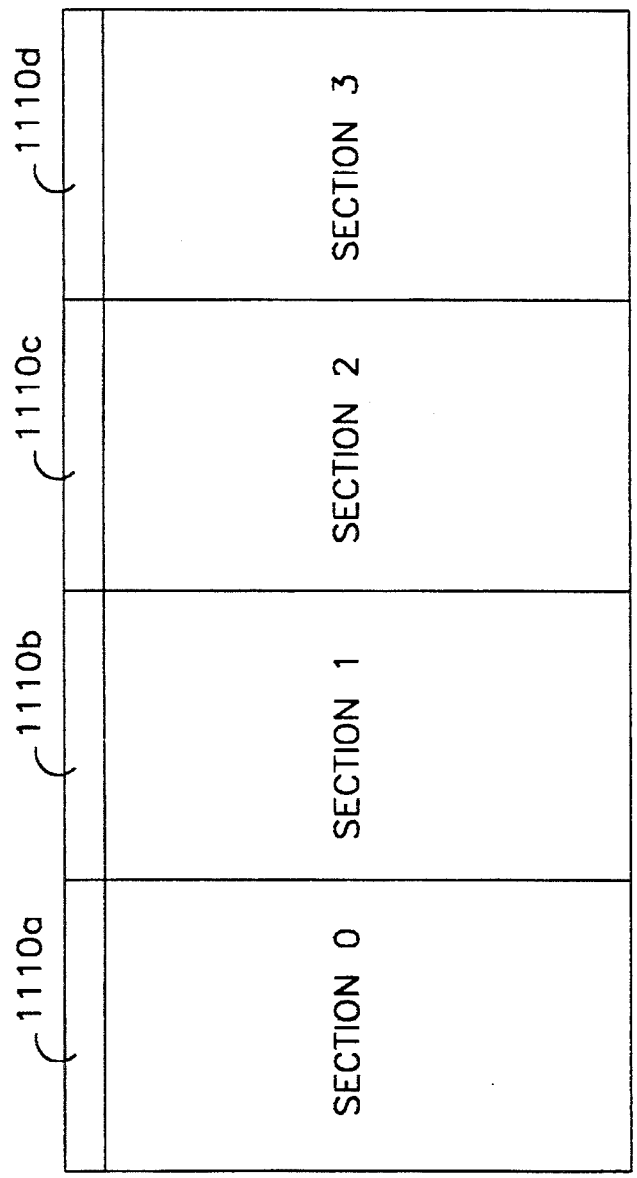
FIG. 5 is an image map diagram which is useful for describing the operation of the decoder shown in FIG. 1.

Following the header information for the picture record are one or more slice records. Each slice record includes one or more macroblock records. In one implementation of the Main Profile, High Level MPEG-2 standard, as adapted for high definition television, a picture is divided into sections where each section contains a slice. Each slice defines a row of macroblocks which, when decoded, extend one-quarter of the way across the image. FIG. 5 is a image map diagram of an HDTV image which shows slices 1110a, 1110b, 1110c and 1110d spanning the image horizontally. In the exemplary embodiment of the invention, each image includes 64 rows of slices, each row including four slices or sections.

The decoder shown in FIG. 1 is arranged in four parallel decoding channels. In general terms, the deformatter/router 110 divides the demodulated bit stream into four parts, sending one part to each of the four decoders, 111a, 111b, 111c and 111d. As described below, each of these decoders handles image data formatted in slices, representing respectively different sections of the resulting image, and produces decoded data in raster format. The decoded data provided by the four decoders is horizontally interpolated in sections by the interpolation filter 118. The sections are then combined in the section raster to high-definition raster converter 120.

The deformatter/router 110 converts the 8 bit HDTV digital signal provided by the HDTV demodulator and digital-decoder (not shown) into a bit serial signal and then processes the signal by detecting start codes. When it detects a start code that represents a sequence, group-of-pictures or picture it transmits all of the information between the detected start code and the next start code to all four of the decoders 111a, 111b, 111c, and 111d. When the deformatter/router 110 encounters the first slice code in any vertical position, it sends the slice code and all information following the slice code (i.e. the slice record) only to decoder 111a. When the next slice record is encountered it is sent to decoder 111b. The following slice record is sent to decoder 111c, and the last slice record at that vertical position is sent to decoder 111d. In the MPEG standard, the vertical position of a slice is encoded in the low-order eight-bits of the slice start code. This position value is 1 at the top of the image and, under the MPEG standard, may be as large as 175 (AF hexadecimal) at the bottom of the image.

After processing four consecutive slice codes, the next slice code encountered by the deformatter/router is sent to decoder 111a. The demultiplexing of the slice codes continues in this manner until a start code which is not a slice start code is detected. Information following this detected start code is again broadcast to all four decoders until a slice start code is encountered. This new slice start code is the first slice start code of the picture. The corresponding slice record is sent to decoder 111a beginning the demultiplexing operation again.

Referring to FIG. 1, the demultiplexed bit stream provided by the deformatter/router 110 is applied to the variable length decoders 112a, 112b, 112c and 112d. Each of these decoders provides four output signals, a coefficient data signal, CD, and a control signal, IDCONT, convey coefficient data and side information, respectively to one of the inverse discrete cosine transform (IDCT) processors 114a, 114b, 114c and 114d, a motion vector and side information data stream, MVS, and a horizontal blanking / vertical blanking signal, HB/VB, which is applied to a respective motion compensation processor 116a, 116b, 116c and 116d.

Each variable length decoder 112 extracts header information from the general records that it receives and extracts and decodes run-length and code values for the variable length encoded DCT coefficient macroblocks that are applied to its input port. These run-length and code values are applied to a coefficient processor (not shown) internal to the variable length decoder 112, where they are converted into macroblocks of quantized coefficient values.

The coefficients in each macroblock are dequantized in the IDCT processors 114a, 114b, 114c and 114d and the dequantized coefficients are then subject to an inverse discrete cosine transformation. The output signal, DP, provided by each of the IDCT processors is actually a pair of bit-streams, each bit-stream representing blocks of decoded pixel values that constitute the macroblocks. FIG. 12 is a timing diagram which illustrates the format of the signals provided by each of the IDCT processors.

Figure 6:
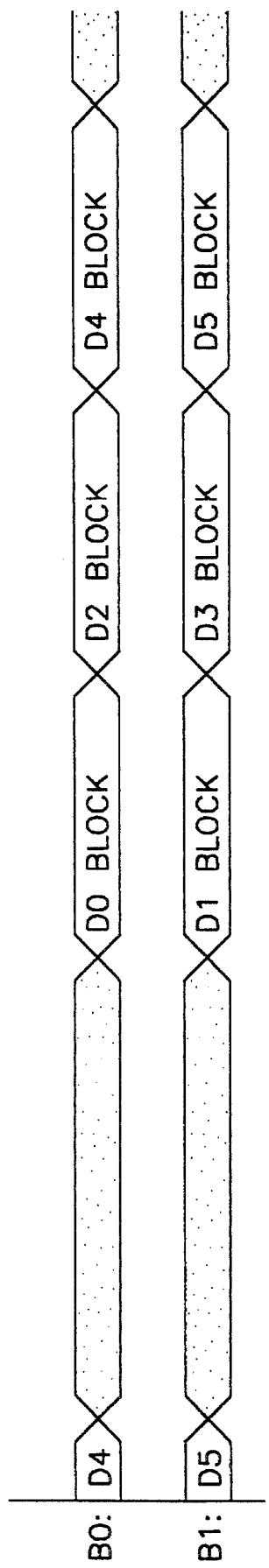
FIG. 6 is a timing diagram which is useful for describing the operation of the decoder shown in FIG. 1.

As described above, each macroblock of pixel values includes four blocks of luminance information Y, and one block each of two color difference signals, U and V. In the exemplary embodiment of the invention, the luminance blocks are numbered 0, 1, 2 and 3 and the chrominance blocks are numbered 4 and 5. The IDCT processors 114a, 114b, 114c and 114d provide the blocks of pixel values via two busses, B0 and B1. FIG. 6 illustrates the order in which the blocks that make-up a macroblock are provided via these two busses.

Under the MPEG-2 standard, the macroblocks of pixel values may be either absolute pixel values or differential pixel values. When the macroblocks contain differential values, the corresponding macroblock also includes motion vector information. This motion vector information is decoded by the respective variable length decoders 112a, 112b, 112c and 112d and is provided, via the signals MVS, to the respective motion compensation processors 116a, 116b, 116c and 116d. The motion compensation processors use the absolute or differential pixel information and, optionally, the motion vector information to recover absolute pixel values for the image slices. These pixel values are provided by the motion compensation processor 116a to the interpolation filter 118.

Depending on the horizontal compression that has been performed on the input image, the interpolation filter 118 expands the image to have levels of horizontal and vertical detail that are appropriate for the receiver's display device. In the exemplary embodiment of the invention, the luminance component, Y, and the chrominance component, C, of the image are expanded horizontally by the interpolation filter 118. In addition, the chrominance component is expanded vertically by a factor of two to produce a number of chrominance samples of each of the U and V color difference signals which matches the number of samples of the luminance signal, Y. It is contemplated, however, that the interpolation filter 118 may be adapted to perform both horizontal and vertical interpolation on all of the image components, Y, U and V.

The output signals of the interpolation filter 118 are applied to section-raster to high-definition-raster converter 120. Converter 120 combines the various interpolated section signals to produce samples representing the luminance signal, Y and two color difference signals, U and V in proper raster format for display on the receiver's display device. In addition, the converter 120 generates a composite blanking signal for the receiver's display device.

The data produced from each section decoder 111a, 111b, 111c and 111d consists of pixels from that section followed by pixels from the next section. For example, the output data from section decoder 111a would also include output data from section decoder 111b. This output data is shown in FIG. 3a and 3b for Y and C where the signal C includes both of the color difference signals, U and V. The last section decoder 111d may have pixel data which does not include data from another section decoder.

As shown in FIG. 1, section decoders 111a, 111b, 111c, 111d include data from other section decoders by providing, as input data to motion compensation processors 116a, 116b, 116c, 116d the output data of each other motion compensation processors 116a, 116b, 116c, 116d. The motion compensation processor for the sections 111a, 111b, 111c and 111d each have memories 140a, 141a, 142a, 143a for storing the pixel data generated by each of the motion compensation processors 116a, 116b, 116c, 116d. Accordingly, each section decoder 111a, 111b, 111c, 111d has access to the pixel data from each other section decoder so that the output pixel data from a section decoder may also include pixel data from the next section decoder. These additional pixels may be referred to as boundary component pixels.

In addition, the motion compensation processors 116a, 116b, 116c, 116d each convert the block into a line format. Motion compensation processors 116a, 116b, 116c, 116d receive from the IDCT 114a, 114b, 114c, 114d pixel data in a block format having scanning lines for two pictures interleaved. Each motion compensation processor converts the block pixel data into a line format data prior to providing the pixel data to interpolation filter 118.

The format of the line and the frame format for the lines provided to the interpolation filter 118 is shown in FIG. 3a. FIG. 3b shows the frame format for luminance and chrominance. Each motion compensation processor doubles the number of lines of the chrominance signal to generate a frame format chrominance signal. Although the number of lines may be doubled by the motion compensation processors 116a, 116b, 116c, 116d, it is contemplated that the interpolation filter 118 may be modified to vertically interpolate lines of chrominance samples in order to double the number of lines. The lines of samples are provided by the section raster to high definition raster converter 120 in alternate fields of even lines and odd lines which, together represent a full frame of the video input signal.

As shown in FIG. 1, the interpolation filter 118 receives 4 channels MCD0, MCD1, MCD2, MCD3 of pixel data from section decoders 111a, 111b, 111c, 111d. The pixel data inputs are 8 bits wide and contain Y/C data multiplexed as YUYVYUYV . . . at 40 MHz.

In addition to the pixel data inputs, the interpolation filter 118 also receives horizontal blanking signal HB0, HB1, HB2, HB3 from each section decoder 111. Further, interpolation filter 118 receives a vertical blanking signal, VB, from section decoder 111a. Horizontal blanking and vertical blanking indicate which pixels are active and which pixels correspond to blanking intervals, that is to say, intervals in which no image information is displayed. Due to the macroblock structure, the horizontal blanking interval is a multiple of 16 pixel sample intervals. If the reproduced image is to fill the screen of the display device, the horizontal interpolation mode, that is to say, the factor by which the image is to be expanded, is determined by the length of the horizontal blanking interval.

For example, if the length of the horizontal blanking signal indicates that the number of pixels in the interval is less than or equal to 288, then 5:3 interpolation is used. If the number of pixels in the interval is less than or equal to 320 but greater 288, then 3:2 interpolation is used. If the number of pixels in the interval is less than or equal to 360 but greater than 320, than 4:3 interpolation is used. If the number of pixels in the interval is greater than 360, then the pass through mode (1:1) is used.

The interpolation filter 118 provides four data output signals D0, D1, D2, D3, one for each section within the interpolation filter. The data output signals are each 8 bits wide and convey Y/C data multiplexed YUYVYUYV . . . at 40 MHz.

Associated with each data output signal is a horizontal blanking signal H0, H1, H2, H3 that indicates which pixels are active in the data output signals D0, D1, D2, D3. These signals are delayed and modified by the interpolation filter 118 to match the processing delay through the filter. A separate horizontal blanking signal is desirable for each output because the number of active pixels in each output signal is not necessarily equal. Each HB is modified to correspond to the number of active pixels from a respective section interpolator. Only one vertical blanking signal, VB, is provided by the interpolation filter 118. This signal is also delayed to match the processing delay through the interpolation filter 118.

Figure 2:
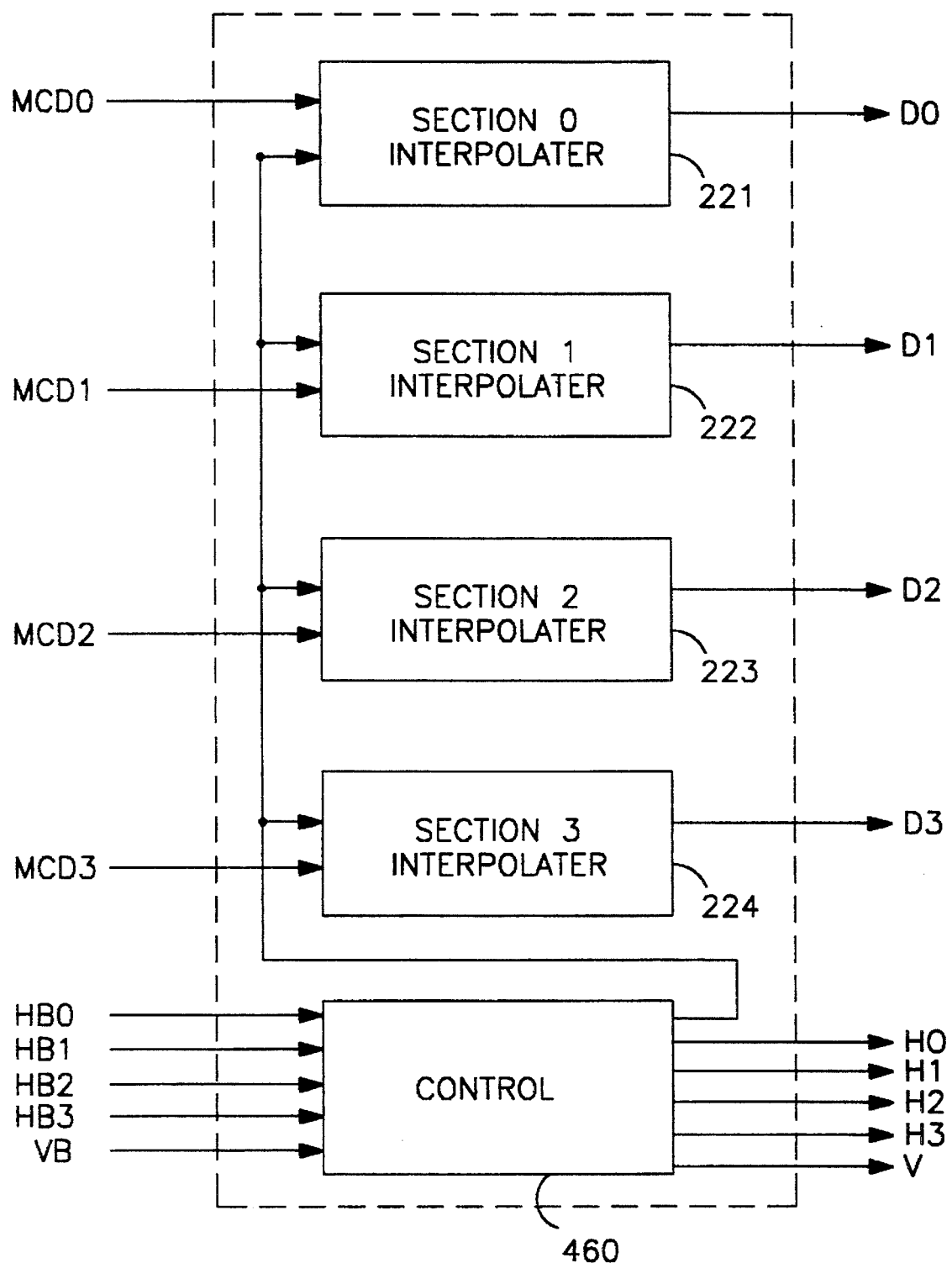
FIG. 2 is a block diagram of an interpolation filter in accordance with the exemplary embodiment of the present invention.

As shown in FIG. 2, the interpolation filter includes four section interpolators 221, 222, 223 and 224. Each section interpolator receives multiplexed Y/C data from a corresponding section decoder 111a, 111b, 111c, 111d. In addition, control circuitry 460 receives the horizontal blanking signals HB0, HB1, HB2, HB3 and the vertical blanking signal VB. The control circuitry 460, based upon the signals HB0 and VB generates control signals which are provided to the section interpolators 221, 222, 223, 224 for controlling the filtering process.

FIGS. 3a–3d show the input line format and frame format and the corresponding output line format and frame format for each of the section interpolators 221, 222, 223, 224 contained in the interpolation filter 118.

As shown in FIG. 3a, Y and C raster data are applied to each section interpolator. For example, consider the Y input pixel data where Y(a,b) represents the data at a particular instant where a represents the current line and b a particular block of data. The input data comprises Y(0,0), Y(0,1), . . . Y(0,n−1), Y(0,n), Y(0,0) . . . Y(0,k). The Y data provided from Y(0,0) to Y(0,n) represents the data from a corresponding section decoder. The Y data from Y(0,n+1) to Y(0,k) represents overlap data (boundary data) from the next section decoder.

Y data from Y(0,0) to Y(0, k) is provided instead of just the section data from Y(0,0) to Y(0,n) so the section interpolators 221, 222, 223, 224 may correctly interpolate those pixels at the boundary between sections. The pixel data from Y(0,n+1) to Y(0,k) in the next section is used to interpolate pixels of the current section. As described below, a section interpolator is so constructed that data from a next section is also used to interpolate a number of pixels in the next section.

FIGS. 3c and 3d show the corresponding output signals of the section interpolators 221, 222, 223, 224. As shown in FIGS. 3c and 3d, Y data is applied to the interpolators and Y' data is produced by the section interpolators.

Figure 4:
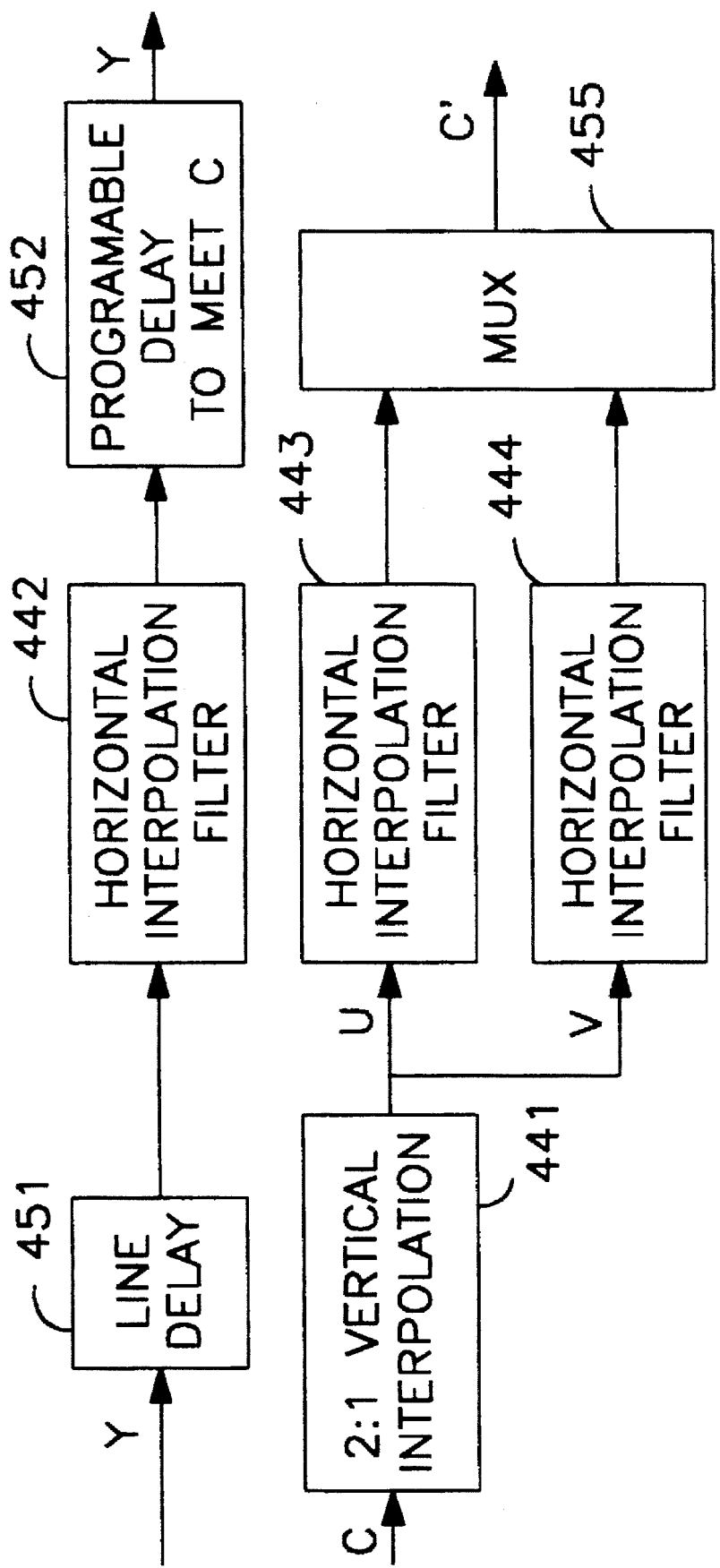
FIG. 4 is a block diagram which shows details of a section interpolator of the interpolation filter shown in FIGS. 1 and 2.

FIG. 4 shows the construction of an exemplary section interpolator 221. The construction of the other section interpolators 222, 223, 224 are the same as that of section interpolator 221.

Section interpolator 221 includes a line delay element 451 connected to horizontal interpolation filter 442 which is connected to programmable delay 452. The delay 542 is an equalizing delay which is programmed such that the output luminance samples, Y', correspond to the output chrominance samples, C'. Also included in section interpolator 221 is an optional chrominance vertical interpolation filter 441, connected to horizontal interpolation filters 443, 444. The output signals of each of the horizontal interpolation filters 443, 444 are in turn connected to a multiplexer 455.

If the vertical interpolation filter 441 is used, then the chrominance signals provided by the motion compensation processor are not line-doubled, as described above. The chrominance input pixel data, C, (i.e. the U and V color difference signals) is received into the optional vertical interpolation filter 441. As shown in FIG. 4, the vertical interpolation filter 441 performs a 2:1 interpolation. Instead of simply doubling the lines, the lines are interpolated by the filter 441 to smooth transitions in the picture.

The output signal of the vertical interpolation filter 441—or the input chrominance signal, if the filter 441 is not used—is provided to two horizontal interpolation filters 443, 444. The horizontal filters 443 and 444 process the U and V color difference signals, respectively. The interpolated U and V output signals of the horizontal interpolation filters 443, 444 are then provided to a multiplexer 455 which interleaves the U and V samples to produce the interpolated C' output signal.

Figure 7:
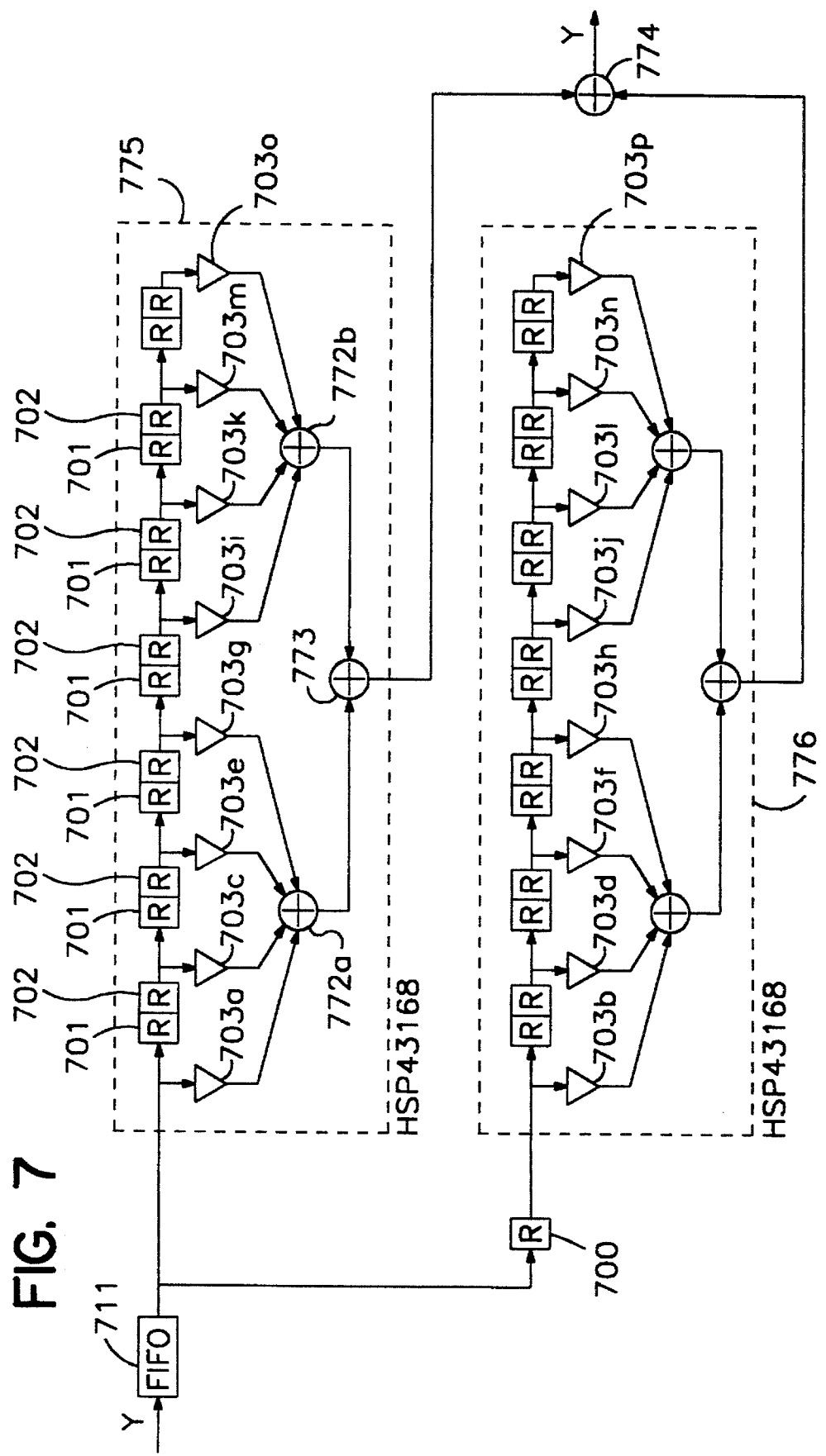
FIG. 7 is a block diagram of a horizontal interpolation filter suitable for use in one of the section interpolators shown in FIGS. 2 and 4.

A block diagram of the horizontal interpolation filter 442 is shown in FIG. 7. This exemplary filter is a 16-tap FIR filter that is implemented as two parallel 8-tap filters. The exemplary filter 442 has programmable coefficients so that it may be used to resample an input signal in different ratios. In the exemplary embodiment of the invention, the control circuitry of the filter shown in FIG. 2 monitors the received horizontal blanking signal to determine the desired resampling rate and changes the coefficients of each of the filters to achieve this desired rate.

FIG. 7 shows two 8-tap filters 775, 776 where the second 8-tap filter 776 receives an input signal that is delayed by one sample period as compared with the first 8-tap filter 775. Each 8-tap filter includes multiple pairs of delay elements 701, 702 which are coupled in series. There are a total of seven delay pairs 701, 702 connected in series. An input port of a multiplier 703 is coupled on either side of each pair of sample delays. The output ports of the first four multipliers 703 are coupled to summing circuit 772a, while the output ports of the next four multipliers 703 are coupled to summing circuit 772b. The output ports of adders 772a and 772b are, in turn, coupled to summing circuit 773. The output ports of the summing circuits 722a and 722b are coupled to respective input ports of a summing circuit 774 which in turn provides an interpolated luminance signal.

In addition to changing the coefficients of the filter, the control circuitry, shown in FIG. 2, controls the amount of time, i.e. the number of clock cycles, that the FIFO memory 771 holds Y input data before providing the Y data at its output port. To program the interpolation filter to implement a 5:3 upsampling mode, the FIFO 771 periodically stops shifting data, holding a sample at its output port for two clock periods. Thus while a continuous stream of Y data, Y0, Y1, Y2 . . . may be input into FIFO 771, the output of FIFO 771 may be Y0, Y1, Y1, Y2, Y2 . . . to the 8-tap filters 775, 776. Thus, for 5:3 upsampling, every 5 clock cycles, the FIFO holds two samples, each for two clock cycles. For 4:3 upsampling, the FIFO holds one sample every 4 clock cycles. For 3:2 upsampling, The FIFO holds one sample every 3 clock cycles. The adjustment of the upsampling rate is made by the control circuitry, responsive to the detected length of the horizontal blanking signal. Section interpolator 221 receives the horizontal blanking signal and in turn provides a control signal to the other section interpolators 222, 223, 224 to effect this control.

Figure 8A:
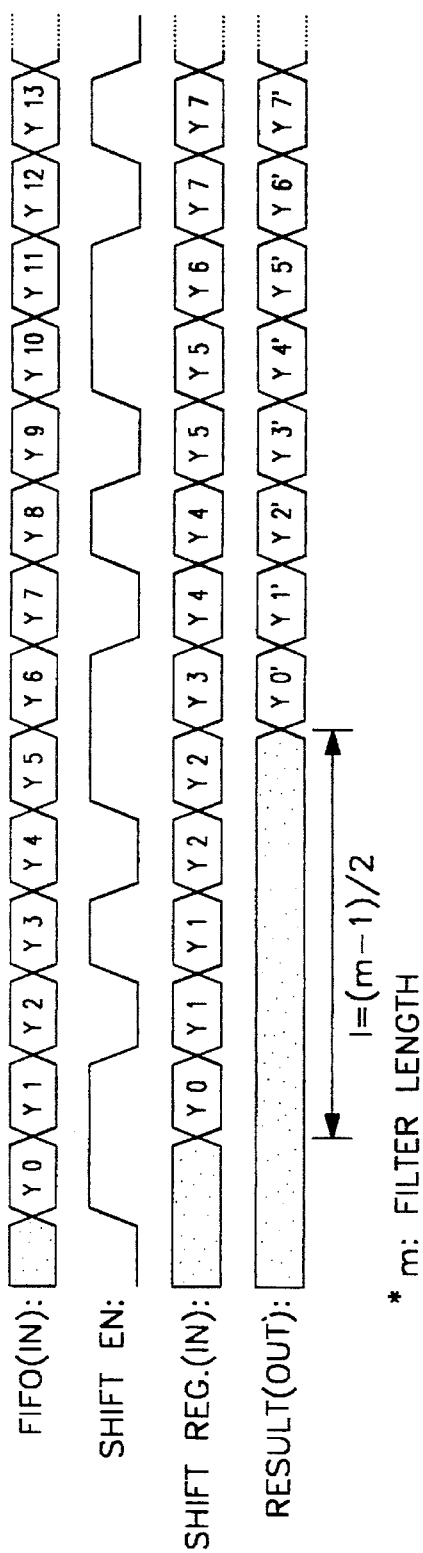
FIGS. 8a and 8b are timing diagrams which are useful for describing the input and output data of the horizontal interpolation filter of FIG. 7.

In operation, as shown in FIG. 8a, as FIFO 771 receives Y data as Y0, Y1, Y2, . . . , the data is shifted out of FIFO 771 as Y0, Y1, Y1, Y2, Y2, Y3, Y4, Y4 . . . . After the data has been shifted out of the FIFO 110, the data is delayed, scaled by the filters coefficient values 703 and summed to produce the samples Y0', Y1', Y2' . . . as the output signal of the adder 774.

Coefficient values, suitable for use in the filters 775 and 776 for a 2:3 upsampling operation, are provided below in Table One. For each coefficient value 703 there are three corresponding coefficient values designated by three phases, one, two and three. The coefficient values used rotate every clock. Thus, for example, the coefficients designated by phase one would be used for the coefficient values 703 for at a first clock. At the next clock, the filter rotates coefficient values to phase two. At the next subsequent clock, the filter rotates to the phase three coefficient values. Then, for the next clock, the process is started again using the phase one coefficient values. Depending on the output provided by FIFO 771, a new sample may or may not be provided when the phase is shifted.

The Tap column provides the correlation with the coefficient value 703 and the coefficient value that is used. The last two coefficient values are zeroed because the last two taps are not used for the 2:3 upsampling.

Table Two below is the same as Table One except that coefficients in Table Two are used for 4:3 upsampling. Table Two includes an additional phase, phase four. The phases are rotated as the 2:3 coefficients values shown in Table One except that the filter rotates through four phases instead of three.

TABLE 1

(2:3 upsampling coefficients)
COEFFICIENT

| TAP | PHASE 1 | PHASE 2 | PHASE 3 |
|---|---|---|---|
| 703a | 0.003298207058 | 0.003717572494 | 0.000000000000 |
| 703b | −.006312040709 | −.008650175833 | 0.000000000000 |
| 703c | 0.015879617431 | 0.021004781978 | 0.000000000000 |
| 703d | −.035083938936 | −.044525795282 | 0.000000000000 |
| 703e | 0.070308273311 | 0.088207677132 | 0.000000000000 |
| 703f | −.142691835822 | −.188028273079 | 0.000000000000 |
| 703g | 0.402993901997 | 0.819882028260 | 1.000000000000 |
| 703h | 0.819882028260 | 0.402993901997 | 0.000000000000 |
| 703i | −.188028273079 | −.142691835822 | 0.000000000000 |
| 703j | 0.088207677132 | 0.070308273311 | 0.000000000000 |
| 703k | −.044525795282 | −.035083938936 | 0.000000000000 |
| 703l | 0.021004781978 | 0.015879617431 | 0.000000000000 |
| 703m | −.008650175833 | −.006312040709 | 0.000000000000 |
| 703n | 0.003717572494 | 0.003298207058 | 0.000000000000 |

TABLE 2

| | | (4:3 upsampling coefficients) COEFFICIENT | | |
|---|---|---|---|---|
| TAP | PHASE 1 | PHASE 2 | PHASE 3 | PHASE 4 |
| 703a | 0.000000000000 | 0.004047774781 | 0.007225308619 | 0.006872688895 |
| 703b | 0.000000000000 | −.012852217472 | −.024432495469 | −.022870469078 |
| 703c | 0.000000000000 | 0.038200165153 | 0.068507714130 | 0.061045723085 |
| 703d | 0.000000000000 | −.096042460920 | −.171349891005 | −.155366012473 |
| 703e | 0.000000000000 | 0.284259204412 | 0.620049363725 | 0.892705603617 |
| 703f | 1.000000000000 | 0.892705603617 | 0.620049363725 | 0.284259204412 |
| 703g | 0.000000000000 | −.155366012473 | −0.171349891005 | −.096042460920 |
| 703h | 0.000000000000 | 0.061045723085 | 0.068507714130 | 0.038200165153 |
| 703i | 0.000000000000 | −.022870469078 | −.024432195469 | −.012852217472 |
| 703j | 0.000000000000 | 0.006872688895 | 0.007225308619 | 0.004047774781 |
| 703k | 0.000000000000 | 0.000000000000 | 0.000000000000 | 0.000000000000 |

The data sample rate of the data being supplied to FIFO 771 is equal to the data sample rate at the output port of the filter. Because the FIFO 771 holds some samples being applied to the 8-tap filter 775, 776, the sample rate of data entering the FIFO 771 is lower than the sample rate of the data provided by the filter. The lowered data sample rate is reflected in the Shift Reg.(in) timing line shown in FIG. 8a in which the Y samples, Y1, Y2, Y4, Y5 and Y7 are shown as being repeated.

Figure 8B:
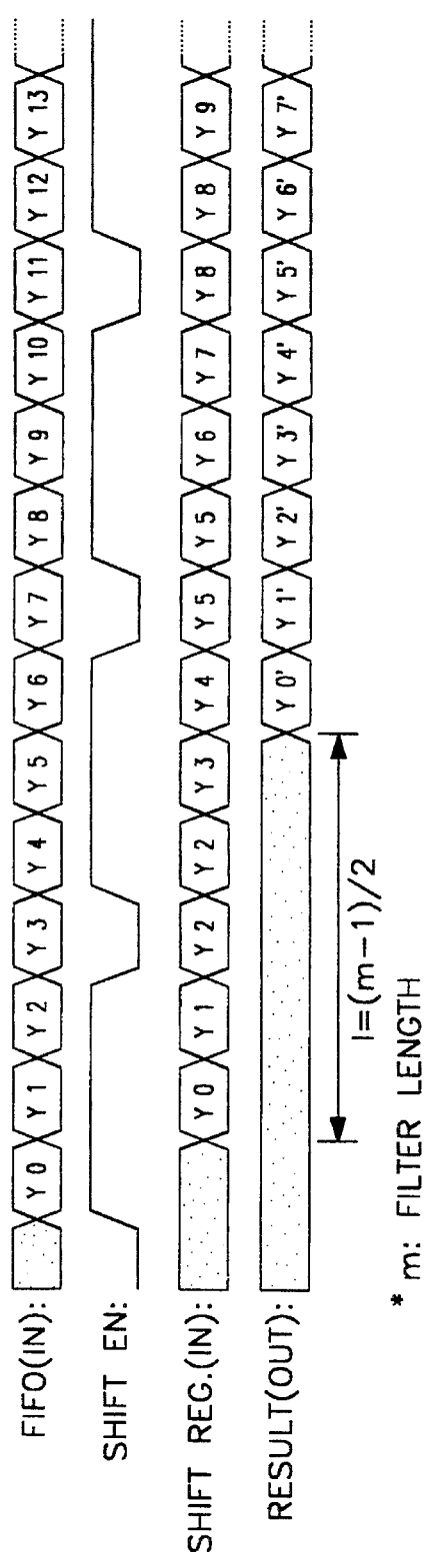

Alternatively, as shown in FIG. 8b, where 1408 pixels are supplied to the interpolation filter, a 4:3 up sampled interpolation ratio is used. In this case, samples Y2, Y5 and Y8 are repeated.

Furthermore, as can be seen from the construction of the horizontal filter, the output signal provided by the interpolation filter is derived not only the current pixel but from pixels which surround the current pixel on either side. Accordingly, a pixel in a section at a section boundary may be interpolated in a similar manner as the other pixels in the current section if pixels surrounding the input pixel at the boundary— including pixels from the next section—are applied to the interpolation filter.

The pixels in the next section are provided as an input signal to the current section interpolator so that the last pixel in a current section may be interpolated using the pixels of a subsequent section. In addition, the current section interpolator interpolates pixels which extend into the next section. As a result, the section interpolator may produce an interpolated output signal which accurately interpolates all of the pixels in a section including the samples at the end of the section and pixels corresponding to the beginning of the next section.

The pixels from the next section are interpolated because the next section interpolator may not produce accurately interpolated samples because it does not have access to samples preceding the first sample in the section. This occurs because an interpolation filter is provided only with corresponding pixel data and pixel data from a subsequent section. However, to interpolate pixels at a start of a section, previous pixels are needed. Since these may not be provided, the pixels at the beginning of the section will not be correctly interpolated. To overcome this problem in the exemplary embodiment of the invention, the current section interpolator interpolates the beginning pixels for the next section of the video image. The number of extra pixels which are interpolated is one-half of the kernel size of the filter. For the 16-tap filter shown in FIG. 7, this would be eight samples.

Since a section interpolator may produce pixel data for a subsequent section, the amount of pixel data from one section interpolator to another may vary if, for example, there is no previous section or no next section. This occurs, respectively, for the first section and the last section in the image. Accordingly, a horizontal blanking signal H0, H1, H2, H3 is provided by the interpolation filter to identify the beginning and end of the interpolated pixel data provided by each section interpolator 221, 222, 223, 224.

In an alternative embodiment, it is envisioned that section interpolators receive both previous and subsequent pixel data so that the section interpolator may interpolate the entire corresponding section.

Using the interpolation strategy described above, all pixel values except for the pixel values at the far right and far left edges of the image are interpolated properly. Accordingly, additional processing of the interpolated signal is not required to generate a complete image from the interpolated signals provided by each section interpolator. Thus, once each section interpolator has interpolated its corresponding section pixel data by also using the pixel data of a subsequent section, the known valid interpolated output values may be combined end to end without additional processing to produce a complete interpolated output signal. The horizontal blanking signals are used to identify the first and last valid interpolated pixel values provided by each section interpolator.

Using the horizontal filter described above, pixel data from section decoder 111a are provided as an input signal to FIFO 771 of section interpolator 221. In addition, pixel data from section decoder 111b of the next section which is near the boundary between 1110a and 1110b are also provided to FIFO 771 of section interpolator 221. Section interpolator 221 uses the input pixel data to produce a corresponding interpolated pixel data output for the first section and the boundary portion (e.g. the first eight pixels) of the second section. This process is applicable to each section interpolator as well as their corresponding components for interpolating input pixel data.

Although an apparatus having two 8 tap filters is shown in FIG. 7, the same function may be performed using a 16 tap filter implemented as a single integrated circuit. Further, other embodiments using different interpolation schemes may be substituted to perform the sampling of the input Y data. For example, the interpolation filter shown in U.S. Pat. No. 5,057,911 by Stec et al., incorporated herein by reference, could be substituted for the horizontal interpolation filter shown FIG. 7.

Figure 11A:
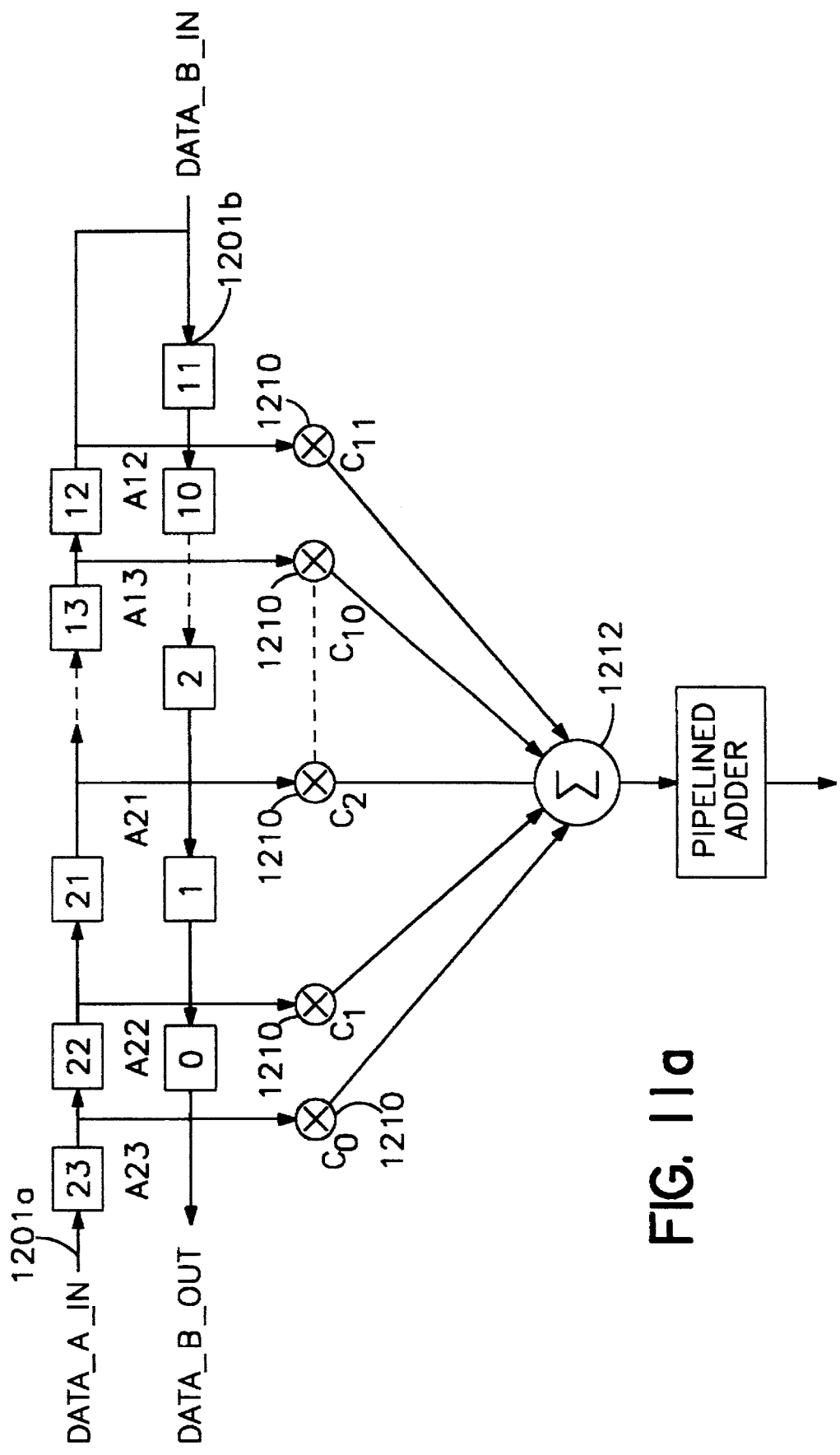
FIGS. 11a and 11b are block diagrams of a horizontal interpolation filter suitable for use in one of the section interpolators.
Figure 11B:
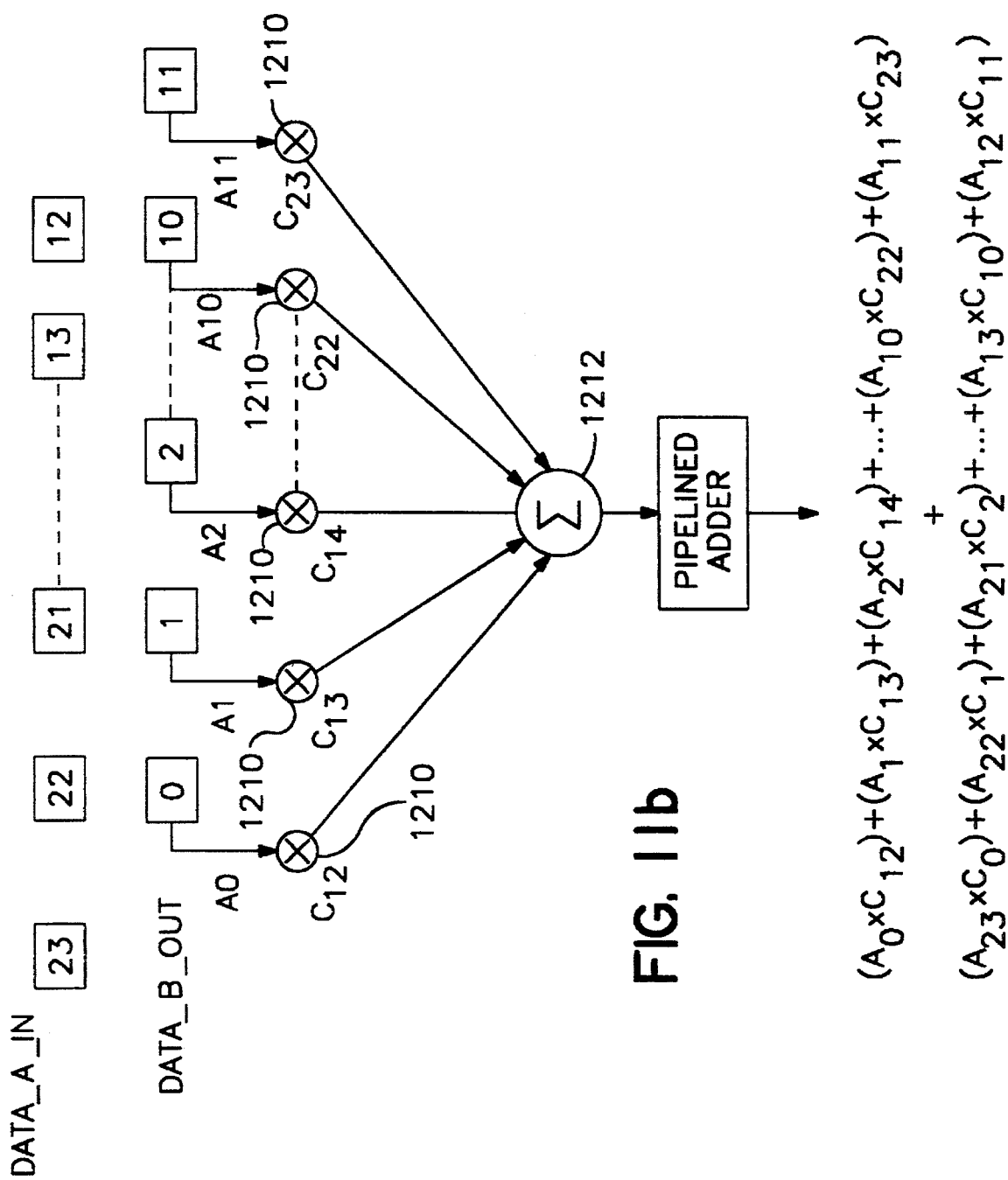

An example of a filter according to U.S. Pat. No. 5,057,911 is shown in FIGS. 11a and 11b. The filter shown in FIGS. 11a and 11b may be used to interpolate the luminance signal, Y. When the signal Y is interpolated, samples are applied to an input port 1201, DATA A IN. The interpolated Y samples are provided at output port 1202. FIG. 11a shows the top row of Y data, A23 to A12, scaled by the coefficients C0 to C11 and FIG. 11b shows the bottom row of Y data, A0 to A11, scaled by C12 to C23 The multipliers 1210 are alternately used to scale the sample values A0 to A11 and A12 to A23. The filter coefficients may be changed at each sampling clock cycle, accordingly different coefficient values may be applied to the filter shown in FIGS. 11a and 11b. The scaled data provided by the multipliers 1210 is applied to a summing network 1212. The coefficients for the filter in FIG. 11 for 4:3 upsampling are shown below in Table three.

TABLE 3

(Coefficients for 4:3 upsampling)

| TAP | PHASE 1 | PHASE 2 | PHASE 3 | PHASE 4 |
|---|---|---|---|---|
| C0 | −1 | −2 | −3 | −2 |
| C1 | 2 | 6 | 7 | 3 |
| C2 | −4 | −11 | −12 | −6 |
| C3 | 7 | 18 | 20 | 9 |
| C4 | −11 | −29 | −32 | −15 |
| C5 | 16 | 43 | 48 | 22 |
| C6 | −24 | −63 | −69 | −32 |
| C7 | 35 | 92 | 101 | 46 |
| C8 | −51 | −134 | −149 | −68 |
| C9 | 76 | 206 | 232 | 109 |
| C10 | −126 | −335 | −425 | −217 |
| C11 | 282 | 958 | 1601 | 1998 |
| C12 | 1998 | 1601 | 958 | 282 |
| C13 | −217 | −425 | −355 | −126 |
| C14 | 109 | 232 | 206 | 76 |
| C15 | −68 | −149 | −134 | −51 |
| C16 | 46 | 101 | 92 | 35 |
| C17 | −32 | −69 | −63 | −24 |
| C18 | 22 | 48 | 43 | 16 |
| C19 | −15 | −32 | −29 | −11 |
| C20 | 9 | 20 | 18 | 7 |
| C21 | −6 | −12 | −11 | −4 |
| C22 | 3 | 7 | 6 | 2 |
| C23 | −2 | −3 | −2 | −1 |

Figure 9:
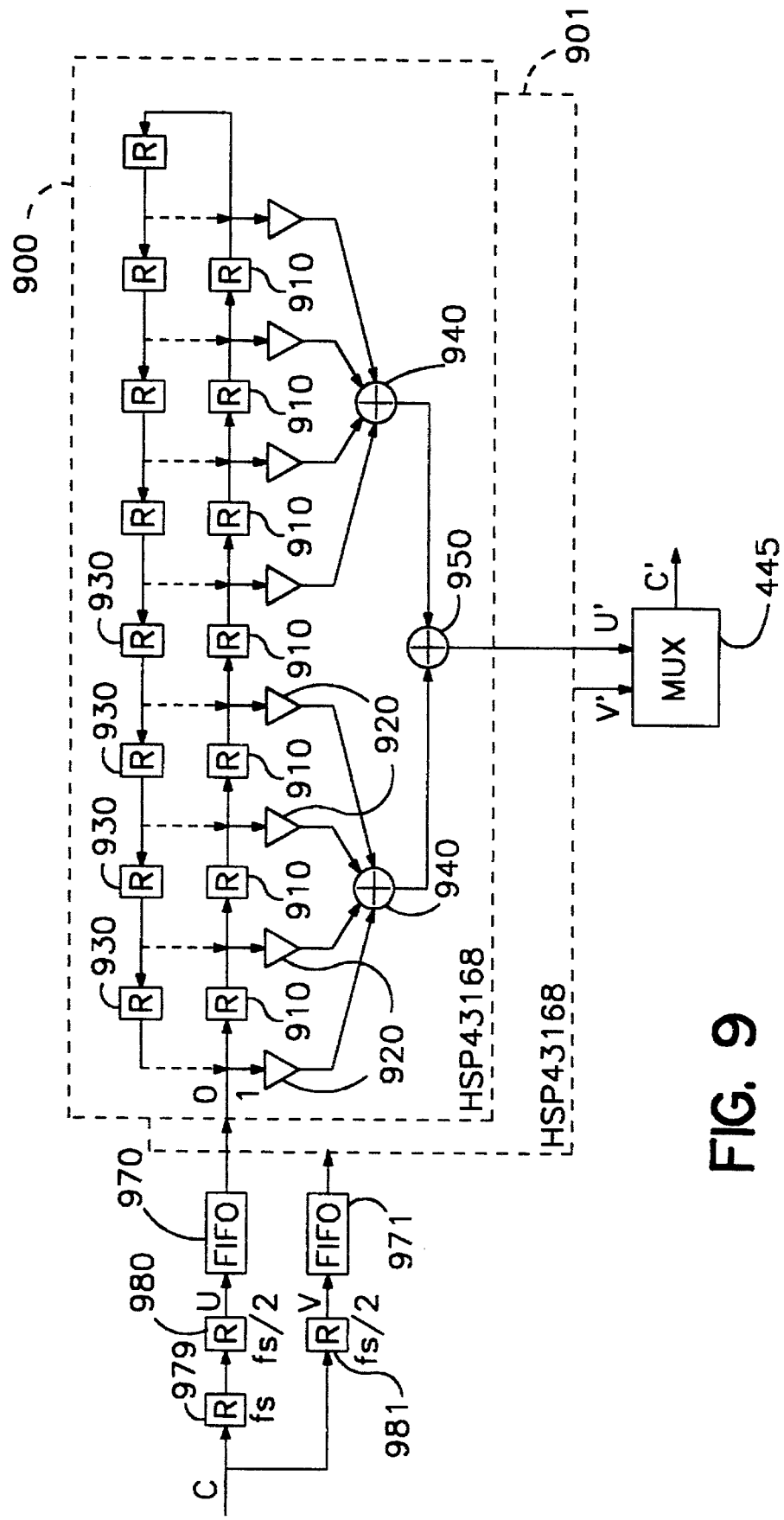
FIG. 9 is a block diagram of another horizontal interpolation filter for interpolating the chrominance signals as shown in FIG. 4.

The second horizontal interpolation filter 443 and the third horizontal interpolation filter 444 interpolating the respective U and V color difference signals are shown in FIG. 9. Two HSP 43168 8 tap interpolation filters available from Harris Semiconductor are used to implement the horizontal interpolation filter 442. However an interpolator in accordance with the above referenced U.S. Patent to Stec et al., may also be used for these filters.

Shown in FIG. 9 is a folded-back 8-tapped delay line symmetrical interpolation filter. The interpolation filters 900, 901 are the same for both U and V interpolation. Since interpolation is performed horizontally, the signal C is separated into U and V components each having a sample frequency which is one-half of the sample frequency of Y (i.e. one-half of the clock frequency applied to the filters 900 and 901). The 8-tap filters perform two calculations during two clock cycles to function as a 16-tapped filter. After the U and V color difference signals are individually interpolated by a respective 8 tap filter 900, 901, they are multiplexed again to form a chrominance signal, C.

As shown in FIG. 8, the chrominance signal C is separated into U and V color difference signals by first delaying the signal applied to the interpolation filter 900, via the register 979, by one clock period and then sampling both signals, using the registers 980 and 981, at one-half of the system clock rate. Because the samples of the U and V signals alternate in the input signal C, only samples of the U color difference signal are applied to the filter 900 and only samples of the V color difference signal are applied to the filter 901. The output signals provided by the delays 980, 981 are coupled to FIFO 970, 971 which are in turn coupled to 8-tapped filters 900, 901 respectively.

Each 8 tap filter 900, 901 is similar in construction. The 8 tap filter 900 includes delays 910 connected in series. The input ports of each of the multipliers 920 is connected to a respectively different tap in the tapped delay line formed by the series coupled delay elements 910. In addition, delays 910 are connected in series with delays 930 to form a folded delay line. The input ports of the multipliers 920 are coupled so that they may be switched between the taps of the delays 910 to the taps of the delays 930. This connection is switched every clock period so that the filter functions as a symmetric 16 tap filter.

The output ports of the multipliers 920 are connected to summing circuits 940 as shown in FIG. 9. The output ports of the summing circuits 940 are connected, in turn, to a summing circuit 950. The output signal of the summing circuit 950 is the output signal of the interpolation filter. The output signal of each of the horizontal interpolation filters 900 and 901 is connected to a multiplexer 455 which produces an interpolated chrominance output signal C' having multiplexed U and V color difference signals.

Since additional samples need to be provided during the expansion of the chrominance signal C, each of the FIFO memories 970, 971 holds every other sample provided by the registers 980 and 981, respectively.

Figure 10:
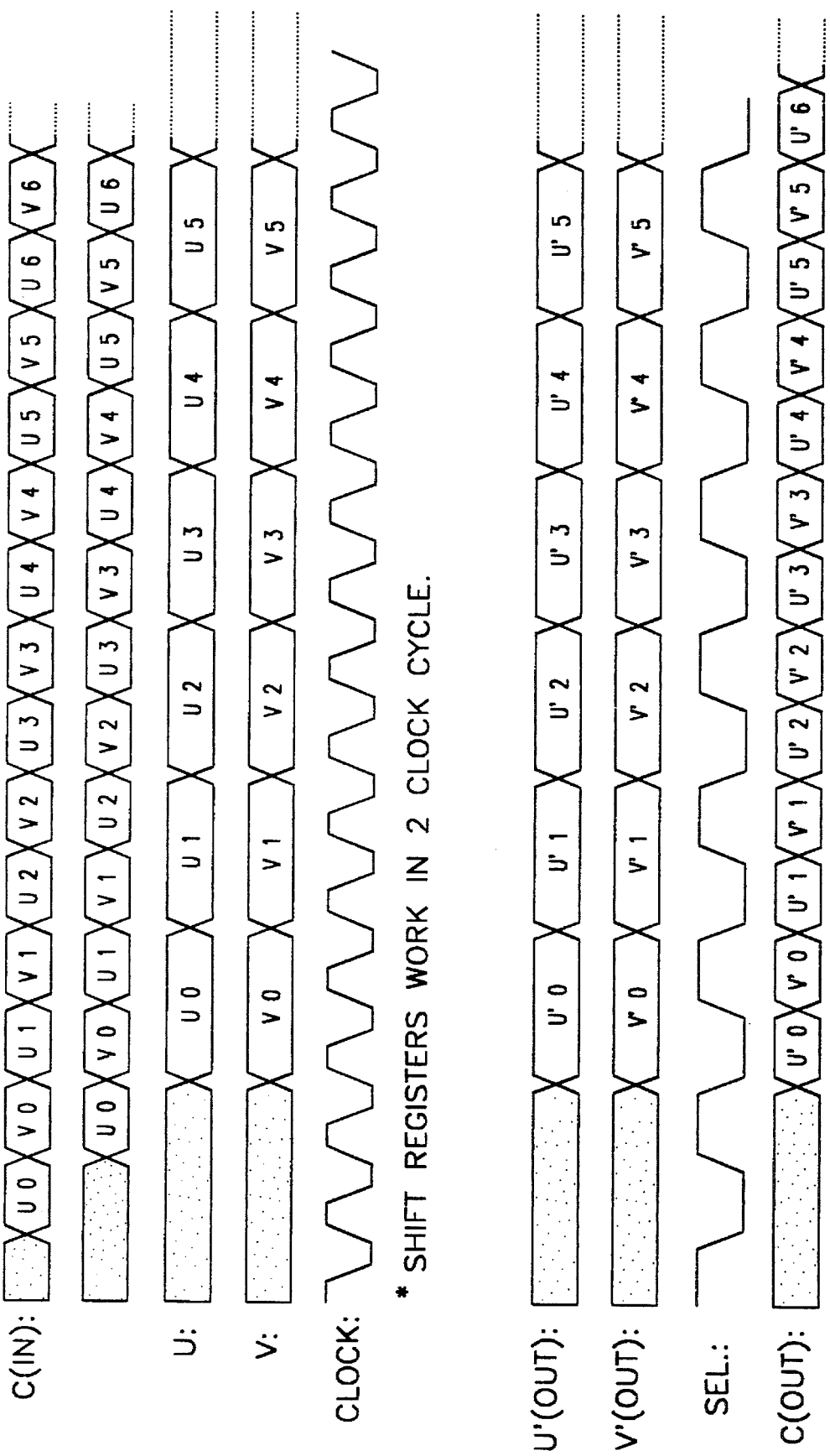
FIG. 10 is a timing diagram which is useful for describing the input and output data of the horizontal interpolation filter of FIG. 9.

The operation of horizontal interpolation filters 900, 901 is illustrated FIG. 10 where the input and output signals of the filters are shown. First, the signal C is divided into U and V component signals. After the signals U and V have undergone interpolation, corresponding U' and V' data outputs are produced. Then the U' and V' are multiplexed together to produce the output signal C'.

The filter shown in FIG. 11a may also be used to interpolate U and V. In this configuration, however, the signals U and V are applied to the input ports DATA A IN, and DATA B IN, respectively. The interpolated U and V data are provided by output port 1202. Accordingly, when U data is being shifted into the filter, an interpolated sample of V data is being calculated and when V data is being shifted into the filter, an interpolated sample of U data is being calculated. The U and V data are scaled and summed to produce their corresponding interpolated U and V outputs. The coefficients values used to interpolate U and V, 4:3 upsampling, using the filter shown in FIG. 11, are shown below in Table four below.

TABLE 4

(Coefficients for 4:3 upsampling for U and V)

| TAP | PHASE 1 | PHASE 2 | PHASE 3 | PHASE 4 |
|---|---|---|---|---|
| C0 | −1 | −6 | 10 | −8 |
| C1 | 4 | 22 | 34 | 24 |
| C2 | −11 | −57 | −83 | −57 |
| C3 | 24 | 125 | 178 | 121 |
| C4 | −52 | −268 | −390 | −279 |
| C5 | 128 | 765 | 1444 | 1927 |
| C6 | 2033 | 1725 | 1114 | 428 |
| C7 | −111 | −370 | −350 | −162 |
| C8 | 47 | 165 | 162 | 76 |
| C9 | −22 | −78 | 75 | −34 |
| C10 | 10 | 33 | 30 | 13 |
| C11 | −3 | −10 | −8 | −3 |

The output signal of each of the section interpolators shown in FIG. 2 is an interpolated section of pixel values of the HDTV image, as shown in FIG. 5.

Referring to FIG. 1, the output signal of the interpolator is provided to section raster to HD raster converter 120. Since the frame is processed in four sections, the four sections of data are desirably combined into one picture. As noted above, each section is divided horizontally from a whole frame line and processed in parallel. Lines of pixel values from all four sections are used to make a frame line. The line period for each section is different because of the interpolation filtering previously performed. The combination of the output signals of the section interpolators 221, 222, 223, 224 is controlled by the horizontal blanking signals H0, H1, H2 and H3, provided by the control section of the interpolation filter, as described above.

Each input channel of section raster to HD raster converter 120 is provided with Y, C and H signals. The horizontal blanking signal H marks the valid active samples for the channel. After an entire line is received, the complete line is then output in the next line period by section raster to HD raster converter 120.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention. For example, although the invention has been described in terms of an interpolation filtering system, it is contemplated that it may be used for other types of processing such as correlation detection and median filtering by replacing the interpolation filters with suitable signal processing apparatus. In addition, although the invention has been described in terms of exemplary embodiments which use one-dimensional filters, it is contemplated that the same technique of applying overlapping boundary areas may be used to effectively partition two-dimensional or N-dimensional signal processing methods into multiple smaller processing operations which may then be easily combined to produce a complete processed signal.

The invention claimed is:

1. Apparatus for processing an input signal representing an image frame having a first section signal followed by a second section signal, the second section signal having a boundary section portion which immediately follows the first section signal in the frame, the apparatus comprising:

memory means for storing the first section signal, the second section signal, and the boundary section portion of the second section signal;

first processing means for receiving from said memory means the first section signal and the boundary section portion of the second section signal and for processing the first section signal and the boundary section portion of the second section signal to produce a first processed signal;

second processing means for receiving from said memory means the second section signal and for processing the second signal, concurrently with the processing of the first section signal, to produce a second processed signal; and means for combining the first processed signal and the second processed signal to produce a processed output signal.

2. Apparatus for processing an input signal having a first section signal followed by a second section signal, the second section signal having a boundary section portion which immediately follows the first section signal, the apparatus comprising:

first processing means for receiving the first section signal and the boundary section portion of the second section signal and for processing the first section signal and the boundary section portion of the second section signal to produce a first processed signal;

second processing means for receiving the second section signal and for processing the second signal, concurrently with the processing of the first section signal, to produce a second processed signal; and means for combining the first processed signal and the second processed signal to produce a processed output signal, wherein:

the first and second section signals include respective first and second timing signal components which indicate valid portions of the respective first and second section signals;

the first processing means includes means for retiming the first timing signal to indicate valid portions of the first processed signal;

the second processing means includes means for retiming the second timing signal to indicate valid portions of the second processed signal; and the means for combining the first processed signal and the second processed signal includes means, responsive to the retimed first timing signal and the retimed second timing signal, for providing the indicated valid portions of the second processed signal immediately after the indicated valid portions of the first processed signal.

3. Apparatus as recited in claim 2, wherein:

the input signal is a video signal the first section signal and the second section signal represent picture elements (pixels) in respectively different portions of a video image and each of the first section signal and the second section signal has a luminance component signal and a chrominance component signal;

the first processing means includes luminance interpolation means for generating an interpolated luminance signal from the luminance component signal and a chrominance interpolation means for generating an interpolated chrominance signal from the chrominance component signal.

4. Apparatus as recited in claim 3, wherein:

the first timing signal is a first horizontal blanking signal which indicates active pixels in the first section signal and the second timing signal is a second horizontal blanking signal which indicates active pixels in the second section signal.

5. Apparatus as recited in claim 4, wherein the chrominance interpolation means comprises:

means for separating the chrominance component signal into first and second color difference signals;

a first horizontal interpolation filter for processing the first color difference signal of the first section signal and the first color difference signal of the boundary section portion of the second section signal to produce an interpolated first color difference signal;

a second horizontal interpolation filter for processing the second color difference signal of the first section signal and the second color difference signal of the boundary section portion of the second section signal to produce an interpolated second color difference signal; and a multiplexer means for combining the interpolated first color difference signal and the interpolated second color difference signal to produce an interpolated chrominance signal.

6. Apparatus as recited in claim 1, further comprising means for separating the input signal into the first section signal and the second section signal.

7. Apparatus as recited in claim 3, wherein the first processing means includes means for changing an interpolation factor employed by the luminance and chrominance interpolation filters in generating the interpolated luminance signal and the interpolated chrominance signal in response to a number of samples in the valid portion of the first processed signal, as indicated by the first timing signal.

8. A filter for processing samples of a sampled data input signal representing an image frame, to generate a processed output signal, the filter comprising:

means for receiving the input signal and for separating the input signal into at least a first component signal and a second component signal, representing respective contiguous sections of the input signal in the image frame, the second component signal having a boundary component signal which is contiguous to the first component signal;

memory means for storing the first component signal, the second component signal, and the boundary component signal;

first filter means for receiving from the memory means the first component signal and the boundary component signal and for filtering the first component signal using the boundary component signal to produce a first filtered signal;

second filtered means for receiving from the memory means the second component signal and for filtering the second component signal to produce a second filtered signal; and means for combining the first filtered signal and the second filtered signal to produce a filtered output signal.

9. The filter as recited in claim 8, wherein the first filter means and the second filter means are interpolation filters.

10. The filter as recited in claim 9, wherein the first filter means and second filter means process the respective first section signal and the second section signal, concurrently.

11. The filter as recited in claim 10, wherein:

the sampled data input signal is a video signal and each one of the first component signal and the second component signal has a luminance component signal and a chrominance component signal; and the first filter means comprises luminance interpolation means for generating an interpolated luminance signal from the luminance component signal and chrominance interpolation means for generating an interpolated chrominance signal from the chrominance component signal.

12. The filter as recited in claim 11, wherein the chrominance interpolation means comprises:

means for separating the chrominance component signal into a first color difference signal and a second color difference signal;

a first horizontal interpolation filter for interpolating the first color difference signal of the first component signal and the first color difference signal of the boundary component signal to produce an interpolated first color difference signal;

a second horizontal interpolation filter for interpolating the second color difference signal of the first component signal and the second color difference signal of the boundary component signal to produce an interpolated second color difference signal; and multiplexer means for combining the interpolated first color difference signal and the interpolated second color difference signal to produce an interpolated chrominance signal.

13. A method for filtering an input signal to produce an output signal comprising the steps of:

(a) extracting from the input signal one to m section signals, where m is an integer; each one of the m section signals being a segment of the input signal which is adjacent to a following one of the m section signals, the following one of the m section signals including a boundary section signal at a boundary between the following one of the m section signals and the one of the m section signals;

(b) storing the m section signals and the boundary section signals in a memory;

(c) retrieving from the memory the one of the section signals and the boundary section signal of the following one of the section signals;

(d) filtering the one of the section signals using information contained in the one of the section signals and in the boundary section signal of the following one of the section signals to produce a filtered section signal;

(e) repeating steps (c) and (d) a plurality of times for each one of the m section signals and a respective following one of the m section signals; and (f) combining the respective m filtered section signals produced by step (e) to generate the output signal.

14. The method according to claim 13, wherein each of the repeated steps (b) performed as a part of step (c) are processed at substantially the same time.

15. A high definition television receiver having an interpolation filter for interpolating an input video signal, the input video signal having a first section signal, representing a first portion of a high definition television image followed by a second section signal representing a second portion of the high definition television image, adjacent to the first portion, the second section signal having a boundary section signal which immediately follows the first section signal, the interpolation filter comprising:

memory means for storing the first section signal, the second section signal, and the boundary section signal;

first interpolating means for receiving from said memory means the first section signal and the boundary section signal and for interpolating the first section signal using the boundary section signal to produce a first interpolated signal;

second interpolating means for receiving from said memory means the second section signal and for interpolating the second signal to produce a second interpolated signal; and means for combining the first interpolated signal and the second interpolated signal to produce an interpolated output signal.

* * * * *